Jan. 29, 1935.   O. E. ROBEY   1,989,427
IRRIGATION APPARATUS
Filed Feb. 29, 1932   2 Sheets-Sheet 1
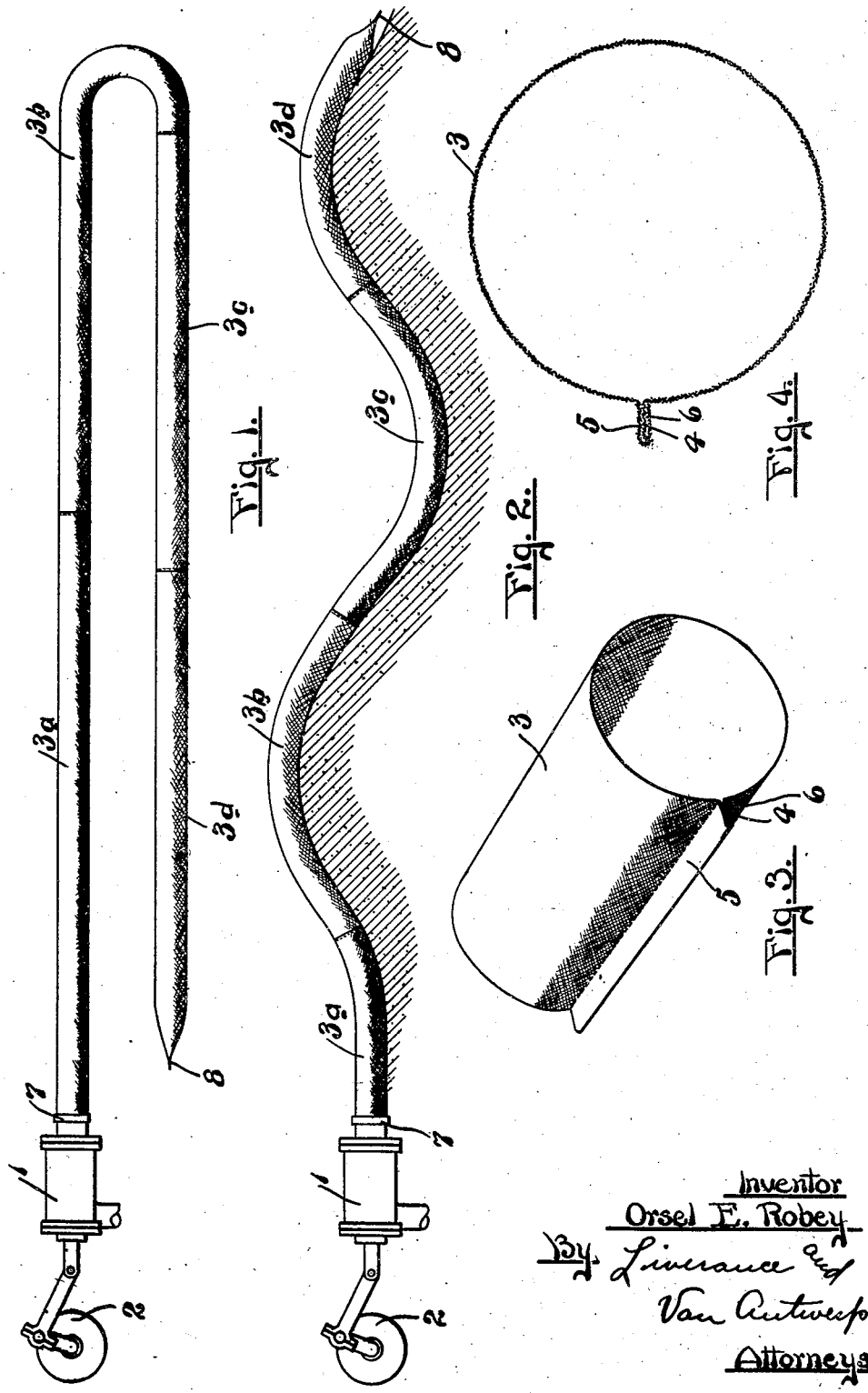
Inventor
Orsel E. Robey
By Liverance and
Van Antwerp
Attorneys Jan. 29, 1935. O. E. ROBEY 1,989,427
IRRIGATION APPARATUS
Filed Feb. 29, 1932 2 Sheets-Sheet 2
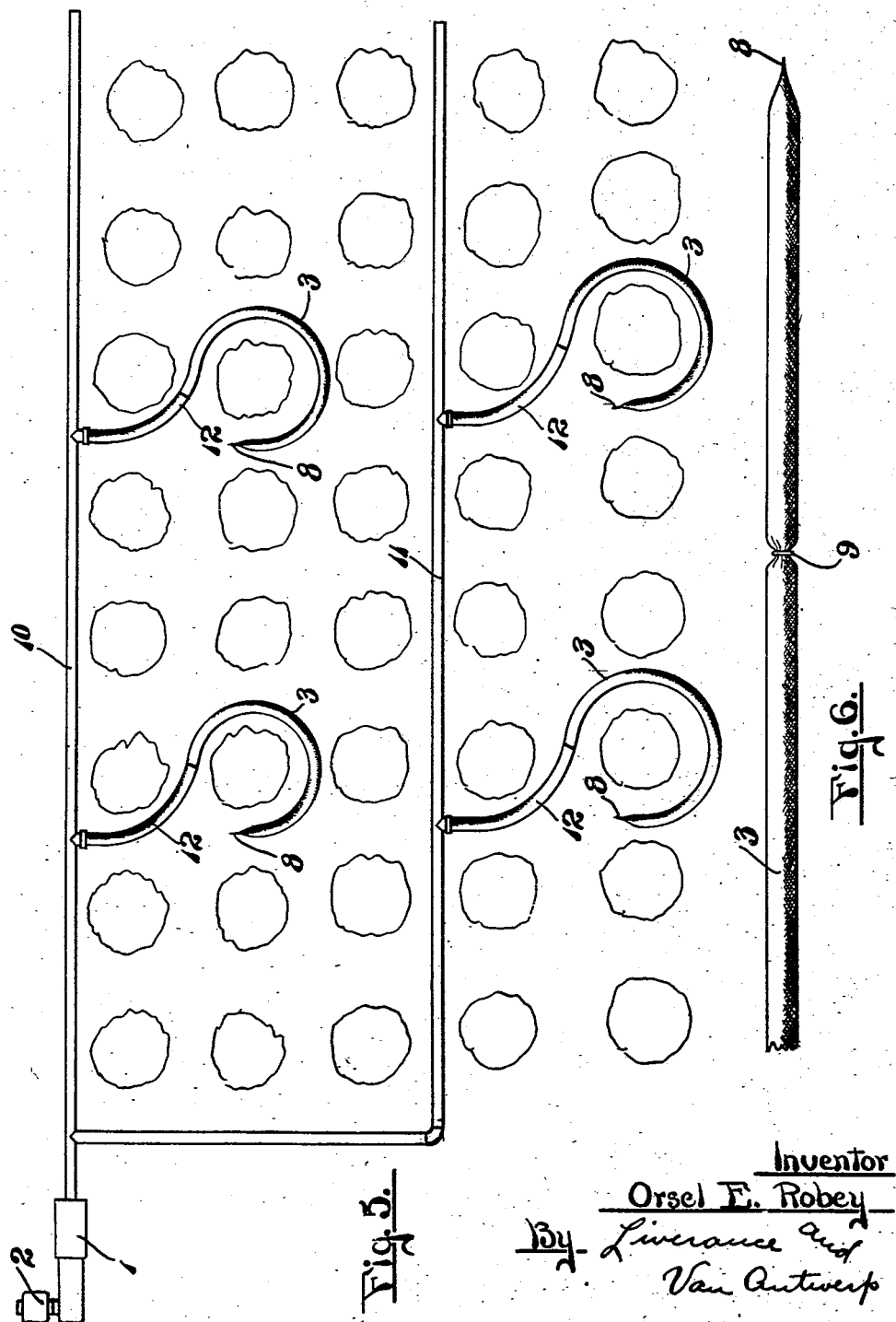
Inventor
Orsel E. Robey
By Liverance and
Van Antwerp
Attorneys Patented Jan. 29, 1935

1,989,427

UNITED STATES PATENT OFFICE

1,989,427

IRRIGATION APPARATUS

Orsel E. Robey, East Lansing, Mich., assignor to Michigan State Board of Agriculture, Lansing, Mich., a corporation of Michigan Application February 29, 1932, Serial No. 595,872

1 Claim. (Cl. 61—12)

This invention relates to the art of irrigation, and is more particularly concerned with a novel apparatus for and process of irrigation wherein water is pumped under pressure into a previous hose closed at its free end, whereby under the pressure of the water it passes through the pores of the hose and escapes therefrom to the ground.

In many types of irrigation it is desirable that the water for irrigating plants, trees or the like shall not only not be wasted but, so far as possible, shall moisten the ground only and not the leaves, stems or limbs of the plants or trees; and with the irrigation process which I have invented this is very readily attained. Likewise the hose, being of a flexible nature, may be moved and bent to conform to the particular tree or plant and the surrounding ground and, furthermore, may be placed as close to or as far away from the plant as may be desirable.

An understanding of the invention may be had from the following description taken in connection with the acompanying drawings, in which, Fig. 1 is a view showing a length of hose attached to a pump, the hose being of several sections connected together in which said sections of the hose may be of the same or a greater weight whereby, in the hose sections which are of greater weight, escape of water therethrough is normally less than in those of the lighter weight and the more pervious character.

Fig. 2 is an elevation illustrating, in exaggerated form, the application of the pervious hose irrigation to uneven ground.

Fig. 3 is a perspective view of a short length of the hose used.

Fig. 4 is a cross section of the hose.

Fig. 5 is a plan view illustrating the pervious hose process of irrigation in connection with trees, as in an orchard, and Fig. 6 is a fragmentary elevation showing the way in which a length of the hose may be either wholly or partially restricted at any desired point in its length, to either completely shut off water in a section of the hose or reduce pressure therein.

Like reference characters refer to like parts in the different figures of the drawings.

In carrying out the process which I have devised a pump, indicated generally at 1, may be driven by any suitable motor as 2, by hand or otherwise so as to pump water into the hose.

The hose 3 preferably is of canvas through which water does not normally freely pass but which is not so impervious that water will not pass, and through which it will pass in greater or less amounts dependent upon the weight of canvas used in the hose and the pressure of water forced therein.

The hose is made by folding a length of canvas longitudinally, one edge having an outturned flap 4 and the other edge being turned outwardly, as at 5, to bear against one side of the flap 4 and then bent back and turned upon itself against the opposite side of the flap 4, as indicated at 6. Then by sewing the three contacting sections 4, 5 and 6 of the canvas a suitable hose is provided.

The hose is any desired length and at one end may be equipped with a suitable fitting 7 to detachably connect with the pump outlet, and at its outer free end is completely closed as indicated at 8.

Water pumped into the end of the hose where it is connected with the pump will flow the length thereof until the closed end 8 is reached, completely filling the hose. The hose may be located upon the ground to be irrigated and with the continuation of water pumping the water passes slowly through the hose and is absorbed by the ground on which it lies. If the hose is placed on ground which is inclined to the horizontal, for instance three or more degrees to the horizontal, one grade and weight of canvas for the entire length thereof works very satisfactorily and a substantially uniform passage of water through the walls of the hose for its entire length occurs. In using short lengths of the hose, the same grade and weight of canvas may be used for the entire length. If any shorter length of hose is needed at any time, less than the length which is at hand it is very easy and convenient, as shown in Fig. 6, to place a stricture around the hose at any desired point, as by tying a cord or twine as indicated at 9, whereby the entire flow of water past said stricture may be stopped.

Or as may be desirable in many cases, the stricture may be made so as not to completely cut off the passage of water, in which case the pressure of water between the stricture and the end of the hose will be less than that between the stricture and the pump and less water will pass through the hose in the section of low pressure than in that of the higher pressure.

It is also contemplated in the present invention that where the length of hose is considerable it may be made up of several sections of different weights and degrees of perviousness. For example, in Fig. 1 the first section 3a may be of heaviest weight, the next section 3b of a less weight and sections 3c and 3d of still less weight whereby the lesser pressures in the sections of less weight will be balanced by the greater freedom of water passage therethrough, thereby making it possible to have a substantially uniform quantity of water escape throughout the entire length of the hose.

Also as shown in Fig. 2, where the hose passes from a rise in the ground to a depression and thence to another rise the sections in the depressions such as 3a and 3c should be of heavier weight and more impervious than the sections 3b and 3d which lie upon the elevated parts of the ground. It is of course to be understood that the illustration in Fig. 2 is exaggerated for the purpose of illustration but that there is shown how, in sections 3a and 3c for example, there is not only the pressure of water from the pump but the increased pressure in said sections due to the head of water which must be overcome when the same is forced to a further elevated position.

In Fig. 5 the use of the pervious canvas hose irrigation process is shown in conjunction with a pipe line 10 and branch 11, of which there may be one or more if needed, the water being pumped thereinto. From the pipe 10 and its branch 11 are connection outlets for the attachment of a number of irrigation members, each of which may conveniently consist of an initial section 12 of a flexible impervious hose, and a terminal section 3 of a pervious hose, having its outer end closed. With this arrangement the pervious section 3 may be located around the base of a tree and any tree irrigated; and after a predetermined time of operation it may be changed to another tree in the orchard.

The construction described and the process of irrigation which has been disclosed has been put to extensive practical tests. One valuable feature of the invention resides in the absence of erosion. That is, there is no falling or impact of water against the ground with a consequent erosion or packing of the ground but the water is absorbed without physical disarrangement, packing or spattering of earth on plants or the like.

The invention is defined in the appended claim and is to be considered comprehensive of all forms of structure coming within its scope.

I claim:

Irrigation apparatus of the class described comprising, a relatively long length of hose formed of pervious canvas or the like whereby water may ooze therethrough, means for supplying water under pressure to one end of the hose, means for closing the other end of the hose, said hose being formed of a plurality of elongated sections, each section being connected to the adjacent sections, the connections lying substantially flush with both the exterior and interior of the adjacent sections, and a cord of lesser circumference than the hose encircling the same to restrict the flow of water at that point, said connections being contractable and having no irregular extensions therefrom.

ORSEL E. ROBEY.